United States Patent
Boyce, Jr. et al.

(10) Patent No.: US 7,685,283 B2
(45) Date of Patent: Mar. 23, 2010

(54) METHOD FOR MODELING ON-DEMAND FREE POOL OF RESOURCES

(75) Inventors: Robert L. Boyce, Jr., Longmont, CO (US); Randy S. Johnson, O' Fallon, MO (US); Tedrick N. Northway, Wood River, IL (US); Walter F. Schmidt, Darien, IL (US); Clea A. Zolotow, Golden, CO (US)

(73) Assignee: International Business Machiens Corporation, Armonk, NY (US)

( * ) Notice: Subject to any disclaimer, the term of this patent is extended or adjusted under 35 U.S.C. 154(b) by 1096 days.

(21) Appl. No.: 11/337,742

(22) Filed: Jan. 23, 2006

(65) Prior Publication Data

US 2007/0174458 A1    Jul. 26, 2007

(51) Int. Cl.
*G06F 15/173*    (2006.01)
(52) U.S. Cl. ........................ 709/226; 718/105
(58) Field of Classification Search ............... 709/226; 718/105
See application file for complete search history.

(56) References Cited

U.S. PATENT DOCUMENTS

| | | | |
|---|---|---|---|
| 5,524,077 A | 6/1996 | Faaland et al. | |
| 5,668,995 A | 9/1997 | Bhat | |
| 6,128,540 A | 10/2000 | Van Der Vegt et al. | |
| 6,898,564 B1* | 5/2005 | Odhner et al. | 703/21 |
| 7,437,446 B2* | 10/2008 | Bailey et al. | 709/223 |
| 2005/0005012 A1* | 1/2005 | Odhner et al. | 709/226 |
| 2005/0259683 A1* | 11/2005 | Bishop et al. | 370/468 |

FOREIGN PATENT DOCUMENTS

JP    2004326754 A  * 11/2004

OTHER PUBLICATIONS

Lada, et al, "Introduction to Modeling and Generating Probabilistic Input Processes for Simulation," 2005 Winter Simulation Conference, Dec. 4, 2005, pp. 41-55, XP010990494.
Singh,etal, "A Bayesian approach to reliability prediction and assessment of component based systems," Software Reliability Engineering, 2001, Nov. 27, 2001, pp. 12-21; XP010583131.
Biem, A et al, "A Bayesian model selection criterion for HMM topology optimization," 2002 IEEE ICASSP, May 13, 2002, vol. 4, pp. 1-989, XP010804862.

* cited by examiner

*Primary Examiner*—Daniel Pan
*Assistant Examiner*—Joseph Gazda
(74) *Attorney, Agent, or Firm*—Yee & Associates, P.C.; William H. Steinberg; Rudolf O. Siegesmund

(57) ABSTRACT

The invention comprises a computer-implemented process for managing computing resources provided to customers in an on-demand data center. The process comprises: providing a shared computing environment; providing to each customer one or more logical partitions of computing resources within the shared computing environment; allocating at least one processing engine to each logical partition; modeling a selected customer's resource utilization as a beta distribution; iteratively selecting a random resource utilization value from the beta distribution and, for each logical partition, calculating a processing engine differential; for each iteration, calculating a collective processing engine differential until the collective processing engine differential converges on an optimal processing engine differential; and adjusting the number of processing engines by the optimal processing engine differential to achieve an optimal free pool size.

18 Claims, 4 Drawing Sheets

US 7,685,283 B2

METHOD FOR MODELING ON-DEMAND FREE POOL OF RESOURCES

FIELD OF THE INVENTION

The present invention relates generally to using data processing for modeling electrical systems and relates specifically to modeling the performance of a computer.

BACKGROUND OF THE INVENTION

For many years, network technology has enabled the sharing of, and remote access to, computing resources around the world. One computer can readily exchange data with a computer down the hall or in another country. Of course, it did not take long for the business world to harness the power of global networks, and network technology has fueled the growth of an entire new industry focused on delivering services across these networks.

This new industry must be able to anticipate and meet customers' processing needs their requirements grow, while maximizing existing resources. One method of maximizing resources is to allow customers to share computing and networking resources. In one implementation of this method, a service provider creates "logical" partitions of computing resources on primary processing units (commonly known as "mainframe" computers). Discrete units of processing capacity within such a shared, on-demand environment are referred to herein as "engines." Typically, a service provider contracts with several customers to provide a certain level of service to each customer, and creates or assigns a logical partition (LPAR) of resources to each customer to fulfill its obligations. One or more of the contracts, though, may allow for a margin of increase in the event of high peak usage. In the event of high usage by one customer, then, the service provider must be able to provide additional resources to that customer without adversely affecting any other customer resource utilization. To provide these additional resources, the service provider may re-allocate computing resources among various logical partitions until the customer's usage returns to normal. Allowing customers to share resources, though, requires the service provider to balance and monitor the shared resources carefully, so that the provider can meet all service obligations.

As new customers subscribe to the on-demand service, capacity planners also must ensure that the service provider has sufficient resource capacity for every customer. Excess resource capacity available to meet on-demand customer requirements is referred to as the "free pool." Capacity planners also frequently set target levels of LPAR utilization. LPAR utilization is expressed as the ratio of engines in use to the number of engines available for use, usually expressed as a percentage of total capacity. There are two goals of LPAR utilization targets: to provide resources necessary to meet unexpected increases in customer demands, and to avoid wasting resources in the face of unexpectedly low customer demands.

Existing methods of on-demand free pool capacity planning involve using mathematical or statistical models to forecast resource usage for incoming customers. Capacity is increased by adding engines to meet the anticipated needs of each new customer. The current capacity planning methods add capacity in direct relation to the anticipated needs of each new customer. Because capacity planning projections are based on partial or estimated data, the projections are historically inaccurate. Further, existing capacity planning methods do not account for effects of more than one customer on capacity at any given time. For example, current planning techniques do not account for multiple customers simultaneously using more than their anticipated capacity.

Thus, a need exists in the art for an improved method and system of estimating the size of a free pool of resources necessary to meet service obligations.

SUMMARY OF THE INVENTION

The invention described in detail below comprises a computer-implemented process and appurtenant products and apparatuses for managing computing resources provided to customers in an on-demand data center, the computer-implemented process comprising: providing a shared computing environment wherein computing resources are shared between the customers; providing to each customer one or more logical partitions of computing resources within the shared computing environment; allocating at least one processing engine to each logical partition; modeling a selected customer's resource utilization as a beta distribution, wherein the mode of the beta distribution marks the selected customer's anticipated resource utilization; iteratively selecting a random resource utilization value from the beta distribution and, for each logical partition, calculating a processing engine differential, wherein the processing engine differential is the difference between the number of processing engines allocated to each logical partition and the number of processing engines necessary to provide the random resource utilization to each logical partition; for each iteration, calculating a collective processing engine differential until the collective processing engine differential converges on an optimal processing engine differential; and adjusting the number of processing engines by the optimal processing engine differential to achieve an optimal free pool size.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "The On-Demand Free Pool Modeler", or "ODFPM."

Figure 1:
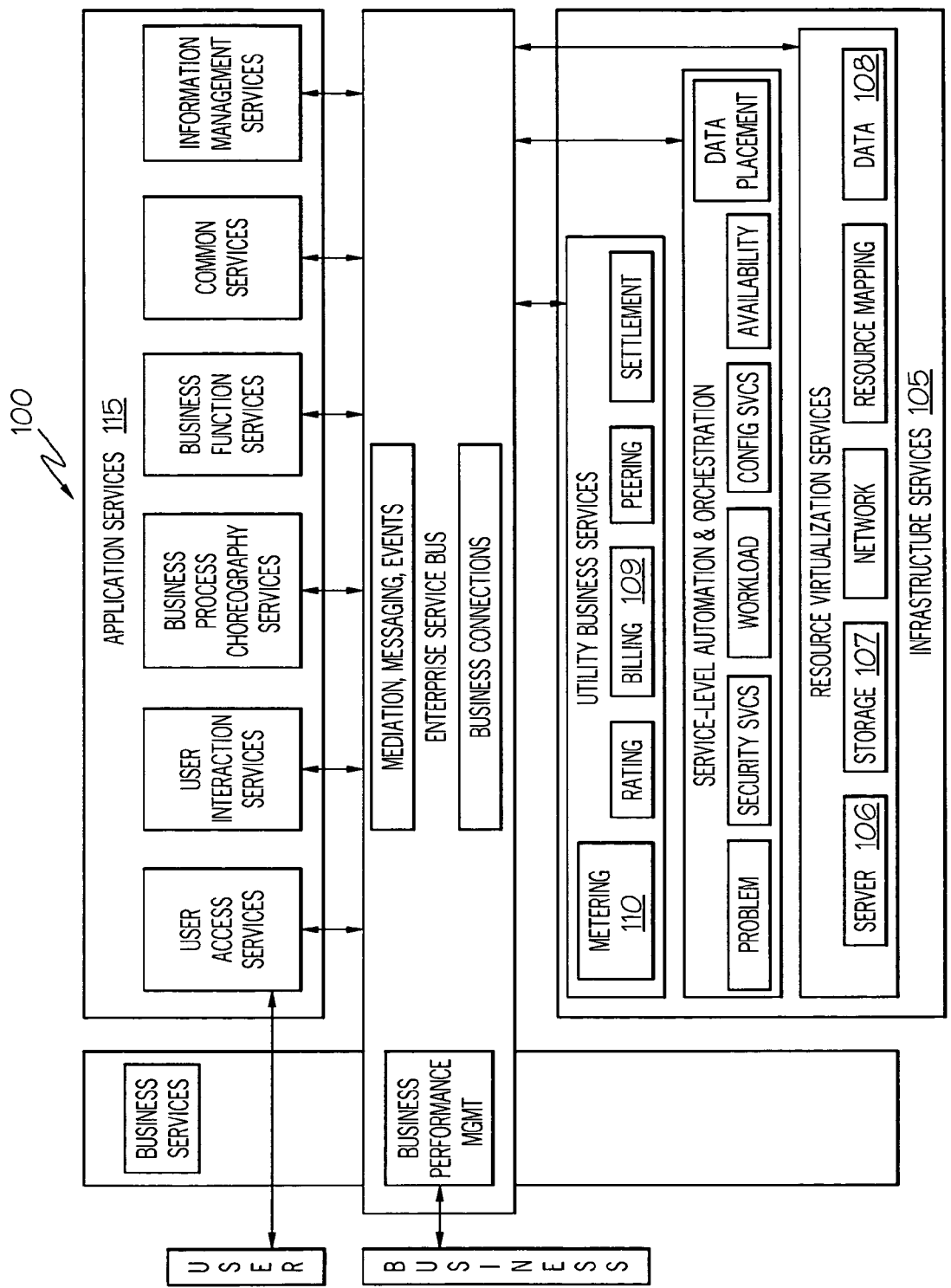
FIG. 1 represents an exemplary on-demand operating environment.

Additionally, the ODFPM is described below with reference to an exemplary on-demand operating environment. In an on-demand data center, hardware and software is shared, simultaneously serving multiple customers in a flexible, automated fashion. It is standardized, requiring little customization, and it is scalable, providing capacity on demand in a pay-as-you-go model. FIG. 1 provides an overview of the architecture of the on-demand operating environment 100 of the present invention. At infrastructure services level 105, components of the environment may be system objects such as servers 106, storage 107, and data 108, or business objects such as billing 109 and metering 110, defined for particular vertical industries or more generally, as they apply horizontally across industries. At the application services level 115, components are dynamically integrated application modules that constitute sophisticated, yet much more flexible applications.

Figure 2:
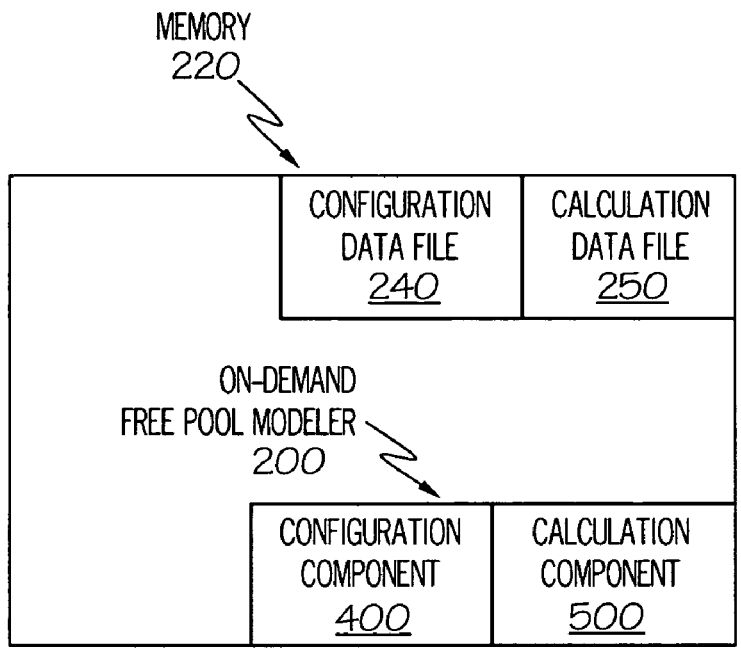
FIG. 2 describes programs and files in memory on a computer.

ODFPM 200 and its components, Configuration Component 400 and Calculation Component 500, typically are stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to ODFPM 200, memory 220 may include Configuration Data File 240 and Calculation Data File 250, with which ODFPM 200 interacts.

Figure 3:
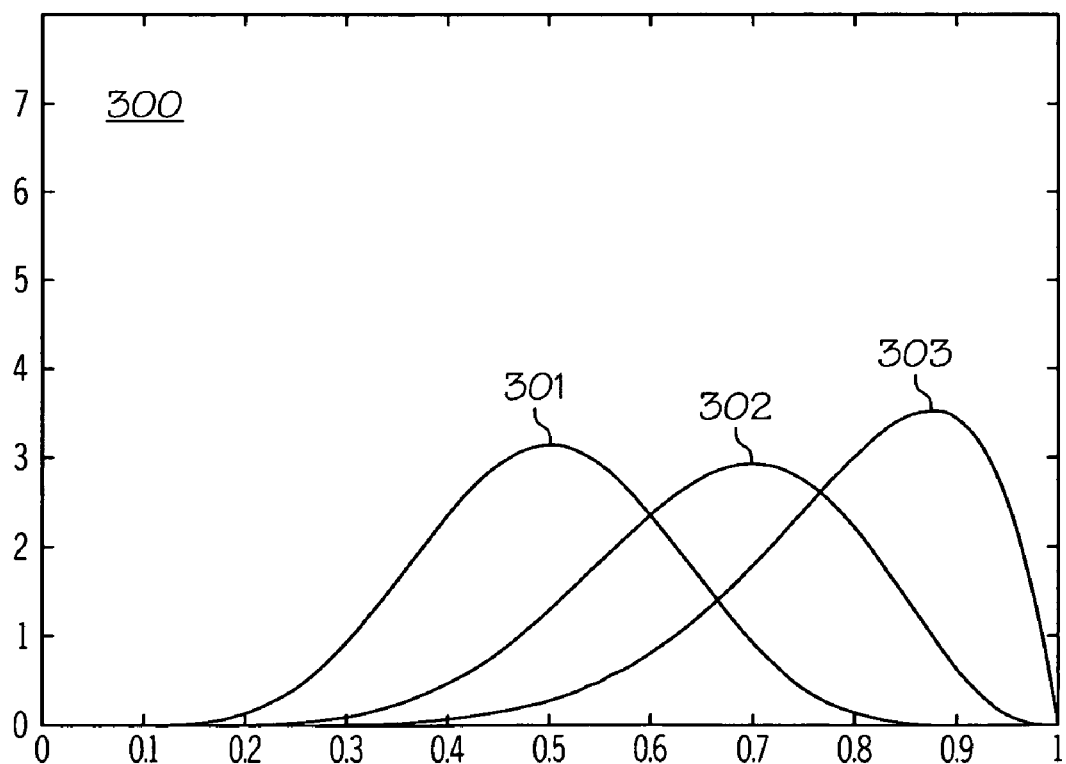
FIG. 3 is a graph of exemplary beta distributions.

ODFPM 200 uses a beta distribution simulation to predict size of the free pool that is required to achieve the utilization targets. This simulation uses probabilities to run thousands of "what-if" scenarios within a specified range of possible outcomes. The probability of an event can be expressed as a bell curve or beta distribution. The results of the simulation can be plotted and statistically analyzed to determine a most probable outcome and to calculate the optimum configuration of variables to achieve a desired outcome. A beta distribution simulation only needs an estimate of customer resource usage to predict the capacity required for a given utilization target. ODFPM 200 estimates customer resource utilization with a beta distribution. A beta distribution is a closed integral, like a bell curve. Every customer will use somewhere between 0% and 100% of their respective LPAR(s). Most of the time, a customer will use only a portion of the available capacity, such as 70%. A beta distribution provides a predictable and repeatable set of random utilizations that describe all probable levels of usage by a customer. The "mode" or apex of the beta distribution marks the anticipated utilization of a customer. The curve of the beta distributions shows that there is a high probability of a customer using resources at or near the anticipated level, and shows a low probability of usage at the extremes. FIG. 3, for example, illustrates three beta distributions. In FIG. 3, beta distribution 301 has a mode at 0.5, or 50%, beta distribution 302 has a mode at 0.7 or 70% and beta distribution 303 has a mode at 0.9 or 90%. This beta distribution simulation will run thousands of scenarios using the beta distribution of possible resource utilizations and determine the change necessary to achieve the target utilization. The results of the simulations will show how much capacity is needed to meet the target utilization levels.

Figure 4:
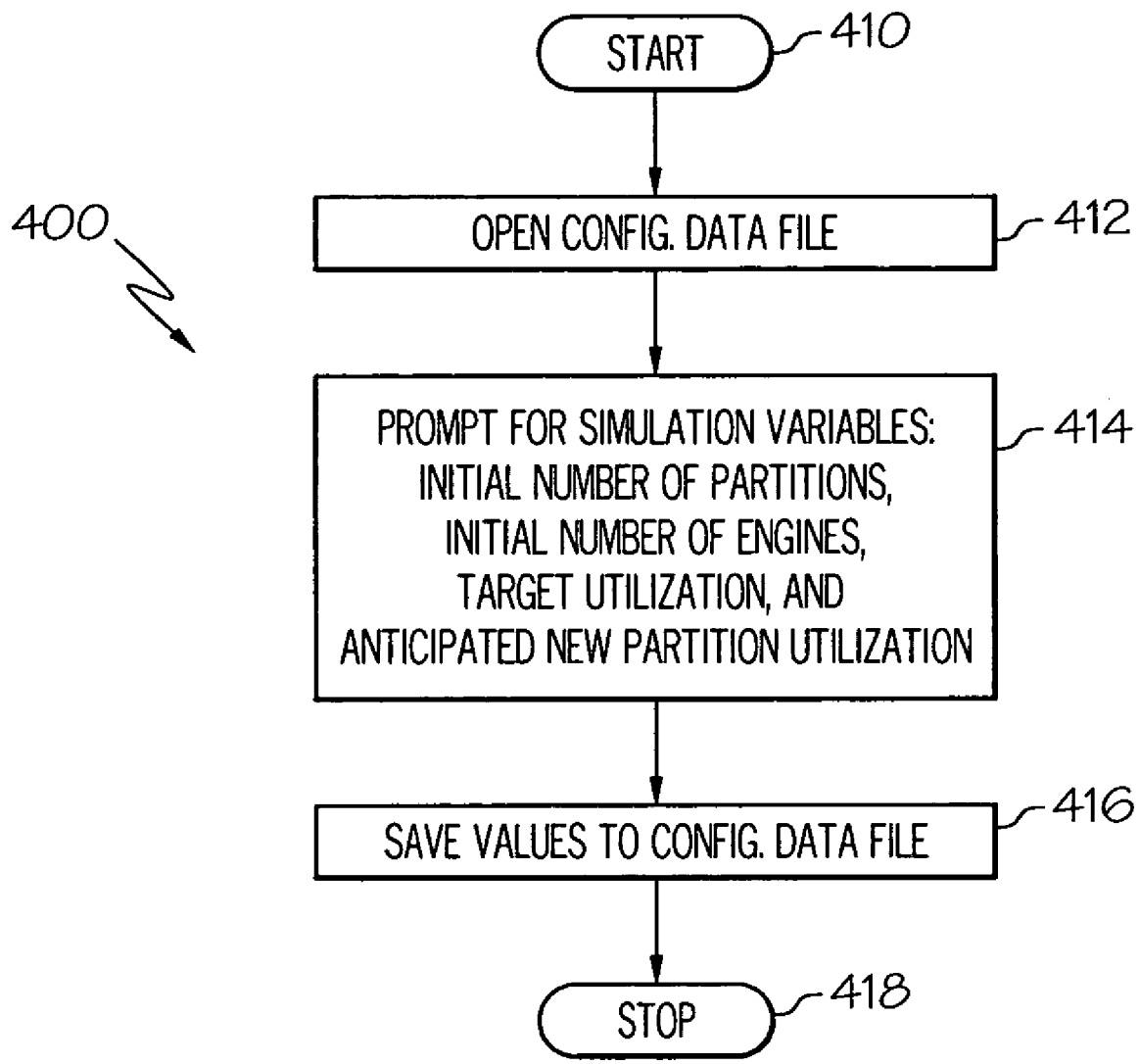
FIG. 4 is a flow chart of the Configuration Component.

FIG. 4 shows one embodiment of Configuration Component 400. Configuration Component 400 starts when initiated by a capacity planner (410). Configuration Component 400 opens Configuration Data File 240 (412) and prompts the capacity planner for the simulation inputs (414). The simulation inputs include: the number of LPARs, the number of engines allocated for each LPAR, a collective target utilization for all LPARs, and an anticipated customer utilization target for each LPAR. The number of partitions and the number of engines for each partition describe the initial configuration of resources. A customer utilization target is an estimate of LPAR utilization provided by each customer, which usually balances engines costs versus desired performance criteria. The simulation inputs are saved to Configuration Data File 240 (416) and Configuration Component 400 stops (418).

Figure 5:
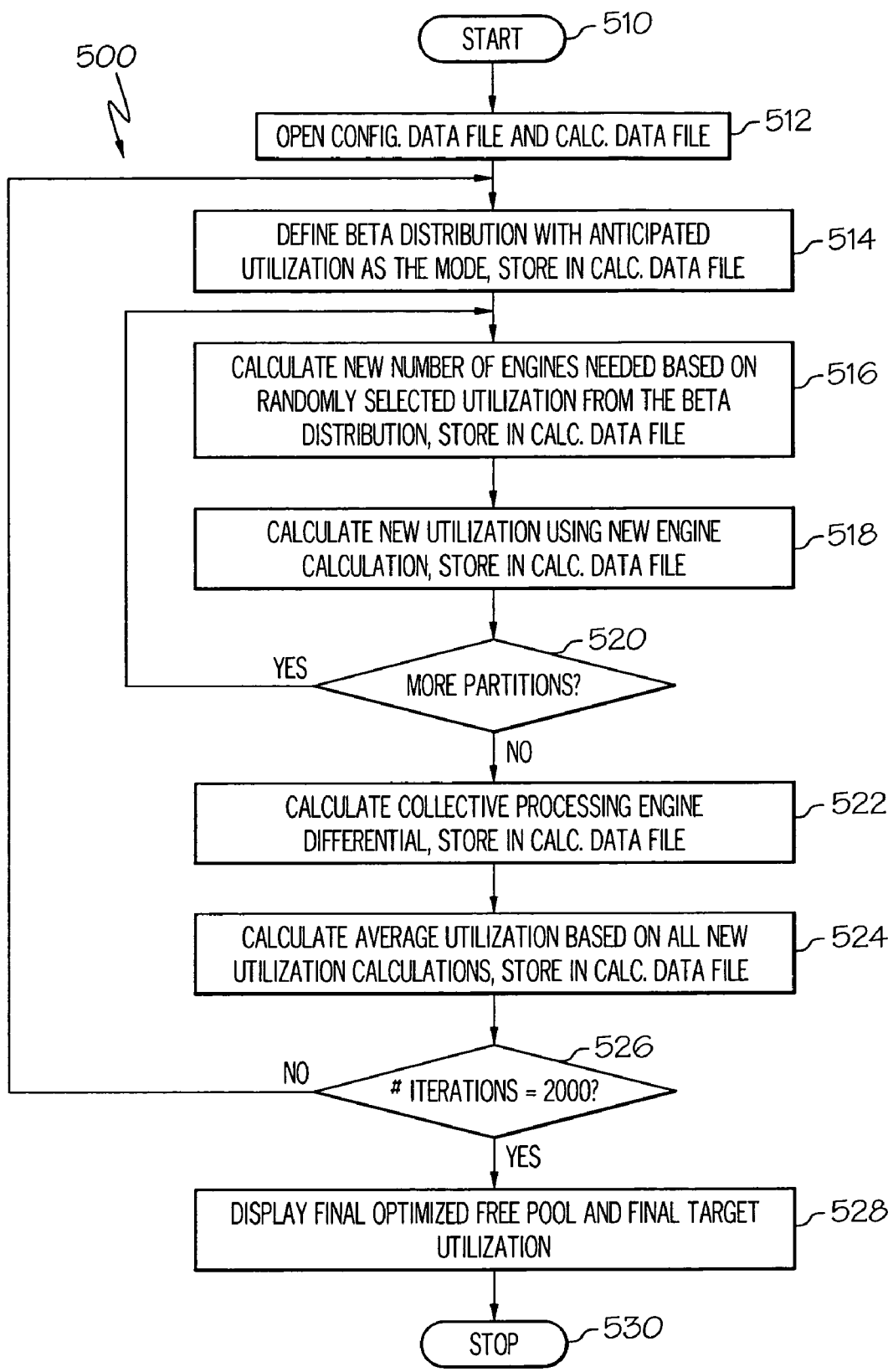
FIG. 5 is a flow chart of the Calculation Component.

FIG. 5 shows one embodiment of Calculation Component 500. Calculation Component 500 starts (510) when initiated by a capacity planner and opens Configuration Data File 240 and Calculation Data File 250 (512). Because there is no known value available for the actual utilization on each LPAR, Calculation Component 500 generates a beta distribution to estimate a range of possible levels of LPAR utilization (514). The "mode" of the beta distribution is set at the anticipated LPAR utilization. Calculation Component 500 selects a random utilization from the beta distribution, calculates the number of engines necessary to support the randomly generated utilization, and stores the calculation in Calculation Data file 250 (516). In one embodiment of the present invention, capacity is a function of whole engines and results are rounded up to the next integer. An alternate embodiment supports fractional engines, though, thus alleviating the need to round up to integers. Even when using fractional engines, though, rounding to the next highest tenth may be desirable. The equation to calculate the new number of required engines is: (new_#_engines)=ceil(random_utilization/target_utilization*#_engines). For example, if the capacity planner specifies 52% target utilization and 3 engines in the partition, and the randomly generated utilization from the beta distribution is 80%, the equation would produce the following results: (new_#_engines)=ceil(0.80/.52*3)=ceil(4.6)=5 engines. A processing engine differential is the difference between the new number of processing engines and the number of processing engines allocated to a given LPAR (i.e. new_#_engines−#_engines). In this example, the processing engine differential is equal to two additional engines, since two additional engines are required to achieve the target utilization for the customer's anticipated utilization. Calculation Component 500 calculates the new utilization for the partition based on the new number of engines and saves the calculation in Calculation Data file 250 (518). The equation to calculate utilization for the partition with the new number of engines: new_utilization=random_utilization*#_engines/new_#_engines. Calculation Component 500 repeats steps 516-518 for each LPAR (520). After utilizations are calculated for each LPAR, Calculation Component 500 calculates a collective processing engine differential, and saves the calculation in Calculation Data File 250 (522). The collective processing engine differential represents the difference between the number of new processing engines required for all LPARs and the original number of processing engines allocated for all LPARs in the on-demand data center (i.e. sum(new_#_engines)−sum(#_engines)). Calculation Component 500 also calculates the average new collective LPAR utilization and saves the calculation in Calculation Data File 250 (524). Calculation Component 500 then compares the average utilization to the target utilization; steps 514-524 repeat until the average utilization converges with the target utilization (516). Calculation Component 500 may perform over 2,000 iterations before the average utilization converges with the target utilization. A threshold may be set so that iterations stop when the average utilization is sufficiently close to the target utilization. The average new utilization may not be exactly the target utilization due to constraints caused by rounding up to the next whole engine in step 516. After all iterations are completed, Calculation Component 500 displays the final calculated free pool and final target utilization (528). The final calculated free pool is the number of new engines needed to support the new customer and maintain the target utilization. The final target utilization is the average utilization supported by the new free pool. After displaying the output, Calculation Component 500 stops (530).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer-implemented process for managing computing resources provided to customers in an on-demand data center, the computer-implemented process comprising:
    providing a shared computing environment wherein computing resources are shared between the customers;
    providing to each customer one or more logical partitions of computing resources within the shared computing environment;
    allocating at least one processing engine to each logical partition;
    responsive to inputting a number of logical partitions, a number of engines allocated for each logical partition, a collective target utilization for all logical partitions, and an anticipated customer utilization for all logical partitions, calculating a beta distribution with the anticipated customer utilization as a mode of the beta distribution, and storing the beta distribution in a calculation data file;
    calculating, for each logical partition, a new number of engines needed using a randomly selected utilization from the beta distribution, storing the new number of engines needed in the calculation data file, calculating a new utilization using the new number of engines, and storing the new utilization in the calculation data file;
    iteratively, for a number of iterations, calculating a collective processing engine differential, wherein the processing engine differential is the difference between an original number of processing engines allocated to each logical partition and a new number of processing engines necessary to provide a random resource utilization value to each logical partition, and storing the collective processing engine differential in the calculation data file, and also calculating an average new collective logical partition utilization, saving the average new collective logical partition utilization, and comparing the average new collective logical partition utilization to the collective target utilization until the average new collective logical partition utilization converges within a predetermined threshold to the collective target utilization; and
    wherein a final calculated free pool is a number of new engines needed to support a selected customer and also to maintain the collective target utilization.

2. The computer-implemented process of claim 1 wherein the number of iterations is at least 2000.

3. The computer-implemented process of claim 1 wherein the selected customer's anticipated resource utilization is an anticipated peak resource utilization.

4. The computer-implemented process of claim 3 wherein the number of iterations is at least 2000.

5. The computer-implemented process of claim 1 wherein the selected customer's anticipated resource utilization is an anticipated average resource utilization.

6. The computer-implemented process of claim 5 wherein the number of iterations is at least 2000.

7. A computer program product for managing computing resources provided to customers in an on-demand data center, wherein the computing resources are shared between the customers and one or more logical partitions of computing resources are allocated to each customer, the computer program product comprising a computer storage medium having a computer-readable program, wherein the computer-readable program when executed on a computer causes the computer to:
    responsive to inputting a number of logical partitions, a number of engines allocated for each logical partition, a collective target utilization for all logical partitions, and an anticipated customer utilization for all logical partitions, calculating a beta distribution with the anticipated customer utilization as a mode of the beta distribution, and storing the beta distribution in a calculation data file;
    calculating, for each logical partition, a new number of engines needed using a randomly selected utilization from the beta distribution, storing the new number of engines needed in the calculation data file, calculating a new utilization using the new number of engines, and storing the new utilization in the calculation data file;
    iteratively, for a number of iterations, calculating a collective processing engine differential, wherein the processing engine differential is the difference between an original number of processing engines allocated to each logical partition and a new number of processing engines necessary to provide a random resource utilization value to each logical partition, and storing the collective processing engine differential in the calculation data file, and also calculating an average new collective logical partition utilization, saving the average new collective logical partition utilization, and comparing the average new collective logical partition utilization to the collective target utilization until the average new collective logical partition utilization converges within a predetermined threshold to the collective target utilization; and
    wherein a final calculated free pool is a number of new engines needed to support a selected customer and also to maintain the collective target utilization.

8. The computer program product of claim 7 wherein the number of iterations is at least 2000.

9. The computer program product of claim 7 wherein the selected customer's anticipated resource utilization is an anticipated peak resource utilization.

10. The computer program product of claim 9 wherein the number of iterations is at least 2000.

11. The computer program product of claim 7 wherein the selected customer's anticipated resource utilization is an anticipated average resource utilization.

12. The computer program product of claim 11 wherein the number of iterations is at least 2000.

13. A computer for managing computing resources provided to customers in an on-demand data center, wherein the computing resources are shared between the customers and one or more logical partitions of computing resources are allocated to each customer, the computer comprising:

a processor;

a memory coupled to the processor; and a computer program stored in the memory, the computer program operable to cause the processor, responsive to receiving a plurality of inputs, the plurality of inputs comprising a number of logical partitions, a number of engines allocated for each logical partition, a collective target utilization for all logical partitions, and an anticipated customer utilization for all logical partitions, to calculate a beta distribution with the anticipated customer utilization as a mode of the beta distribution, and to store the beta distribution in a calculation data file;

to calculate, for each logical partition, a new number of engines needed using a randomly selected utilization from the beta distribution, store the new number of engines needed in the calculation data file, calculate a new utilization using the new number of engines, and store the new utilization in the calculation data file;

iteratively, for a number of iterations, to calculate a collective processing engine differential, wherein the processing engine differential is the difference between an original number of processing engines allocated to each logical partition and a new number of processing engines necessary to provide a random resource utilization value to each logical partition, store the collective processing engine differential in the calculation data file, and also to an average new collective logical partition utilization, store the average new collective logical partition utilization in the calculation data file, and to compare the average new collective logical partition utilization to the collective target utilization until the average new collective logical partition utilization converges within a predetermined threshold to the collective target utilization; and wherein a final calculated free pool is a number of new engines needed to support a selected customer and also to maintain the collective target utilization.

14. The computer of claim 13 wherein the number of iterations is at least 2000.

15. The computer of claim 13 wherein the selected customer's anticipated resource utilization is an anticipated peak resource utilization.

16. The computer of claim 15 wherein the number of iterations is at least 2000.

17. The computer of claim 13 wherein the selected customer's anticipated resource utilization is an anticipated average resource utilization.

18. The computer of claim 17 wherein the number of iterations is at least 2000.

* * * * *